(No Model.)
R. S. WARING.
JOINT CONNECTION IN LEAD COVERED ELECTRIC CABLES.
No. 284,099. Patented Aug. 28, 1883.
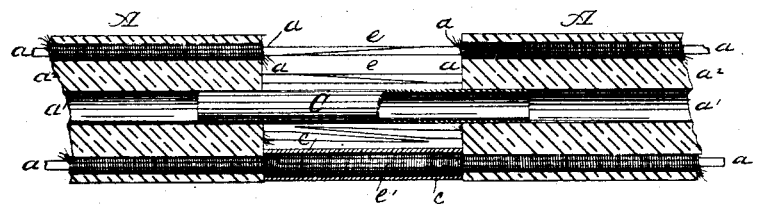
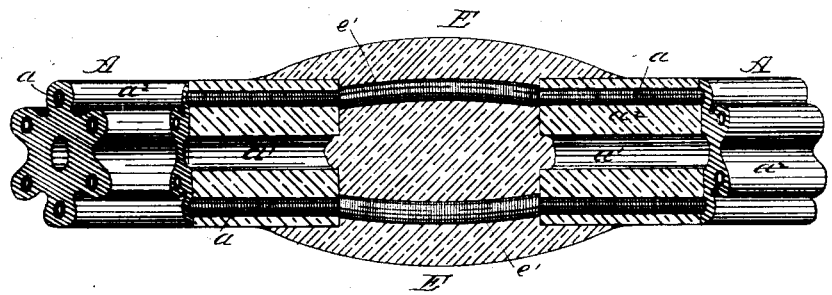
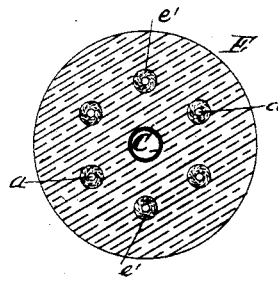 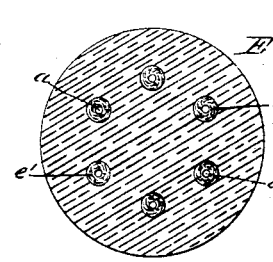 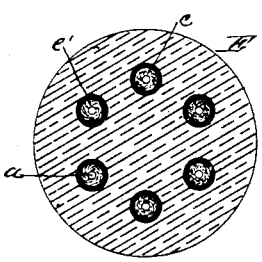
Witnesses
C. S. Parker
R. H. Whittlesey
Inventor Richard S Waring
By Attorney George H. Christy

UNITED STATES PATENT OFFICE.

RICHARD S. WARING, OF PITTSBURG, PENNSYLVANIA, ASSIGNOR TO THE STANDARD CABLE COMPANY, OF SAME PLACE.

JOINT-CONNECTION IN LEAD-COVERED ELECTRIC CABLES.

SPECIFICATION forming part of Letters Patent No. 284,099, dated August 28, 1883.

Application filed February 26, 1883. (No model.)

*To all whom it may concern:*

Be it known that I, RICHARD S. WARING, a citizen of the United States, residing at Pittsburg, county of Allegheny, State of Pennsylvania, have invented or discovered a new and useful Improvement in Making Joint-Connections in Lead-Covered Electric Cables; and I do hereby declare the following to be a full, clear, concise, and exact description thereof, reference being had to the accompanying drawings, making a part of this specification, in which—like letters indicating like parts—

Figures 1 and 2 are longitudinal sectional views of parts of an electric cable and joint illustrative of my invention; and Figs. 3, 4, and 5 are transverse sectional views of my improved joint, illustrating certain modifications in details of construction.

My invention relates to the formation of a joint or connection between sections of lead-covered electric cable; and in general terms it consists in making electrical or metallic connection between the protruding ends of the conducting-wires, covering the exposed metallic surfaces of the conductors with a wrapping or coating of electric insulating material, and, if desired, wrapping such coated wires with sheet metal or equivalent material to protect the insulation from heat, and finally filling the space between and around each and all the wires, and joining or uniting the metal covering of the cable ends with a "plumber's wipe" of solder, as hereinafter more fully described and claimed.

I have illustrated my present invention in connection with two ends or sections of lead-covered cable, A, in which insulated conducting-wires $a$ are inclosed within separate passages in the lead body $a^2$, arranged at intervals around its central core-passage $a'$.

As a preliminary step in making a joint between sections of such a cable, the lead body $a^2$ at the ends to be joined is cut away, leaving the wires $a$ protruding a sufficient length—say from one to two inches—for making connection between wire ends, as illustrated in Fig. 1. In doing this the wire ends are denuded or stripped of their insulating-covering, and then connected in line by lapping, twisting, or soldering to form continuous electric conductors through successive lengths.

On account of economy in space occupied and strength of connection secured, I prefer to connect the wire ends by tapering, lapping, and soldering, as represented at $e$, Fig. 1, this being a well-known way of connecting electric conductors. The wires being securely connected, care being taken to secure good metallic contact or electrical connection between them, their exposed or denuded metallic surfaces are covered or coated with a wrapping or covering, $e'$, of some good insulating material, by preference of fibrous nature—as silk, cotton, or asbestus—and, if desired, such wrapping may be saturated or coated with some insulating compound, as paraffine or asphaltum. I then apply a body of solder, E, in the manner ordinarily practiced by plumbers in forming a "wipe," working it into and filling the space between and around each and all the wires, and making a solid weld or connection with the ends and exterior surface of the lead covering of the cable-sections, as illustrated in Figs. 2 and 3. This body of solder, being a good electrical conductor and completely enveloping and separating the wires, will effectually prevent electrical induction, substantially the same structure and arrangement of metal covering and insulated conductors being preserved or secured in the joint as in the cable proper.

This method of making a joint-connection by embedding the spliced and insulated wires within and separating them from each other by a common body of soldering material I consider of special value and importance. It affords equal or even greater strength than the cable proper. It can be reeled with the cable without injury. Moisture or other foreign matter is effectually excluded from the wires, and their insulation, both from the exterior and from the interior passage $a'$ of the cable and the conductors, will be protected against induction at the joint by substantially the same means as in the cable proper.

If it is desired to preserve a tubular passage $a'$ through the joint as well as in the cable, it may be done by inserting the ends of a metal tube, C, in the passages $a'$ of the two cable ends before joining the wires $a$. In such case the solder-wipe will be built upon the tube, as illustrated in Fig. 4, the wires, however, being embedded within and surrounded by the solder, as before described; also, if desired to protect the insulating-covering of the spliced wires from the heat of the solder, a light wrapping of sheet metal, $c$, of lead, copper, or tin, may be applied, as illustrated in Figs. 1 and 5, before soldering, in order to prevent direct contact of the hot solder with the insulation; also, this method of forming joint-connections may be applied to solid as well as tubular lead-covered cables and to cables having a covering of other soft ductile metal or equivalent alloy, the function or purpose of the body of solder in uniting the cable ends and protecting the wires from moisture, injury, and electrical induction being the same in any such case.

I make no claim herein to the construction and form of the cable A, alone considered, the same or substantially the same being included in a separate application for patent filed by me January 29, 1883, Serial No. 83,308.

I claim as my invention—

1. The method herein described of connecting sections of lead-covered electric cable having two or more wires inclosed within separate passages in the lead covering, consisting in uniting the ends of the conducting-wires with metallic contact, covering the denuded surfaces of such conductors with electric insulating material, and filling the space between and around each and all the wires with a body of solder, making a solid connection with the cable ends, substantially as and for the purposes set forth.

2. The method herein described of making joint-connection between sections of compound metal-covered electric cable, consisting in uniting the ends of the conducting-wires with metallic contact, covering the denuded surfaces of such conductors with electric insulating material, inclosing such covering within a wrapping or case of sheet metal, and filling the space between and around each and all the wires with a body of solder, making a solid connection with the cable ends, substantially as set forth.

3. The sections A A of lead-covered cable, having therein insulated conductors $a$, the ends of which protrude from the lead covering, and are connected in continuous lines with metallic contact between ends, in combination with insulating-coverings $e'$, inclosing the connection between wire ends, metallic coverings $c$, surrounding the insulating-coverings of the wires between cable ends, and a wipe, E, of solder, filling the space between and around each and all the wires, and making solid union with the cable ends, substantially as and for the purposes set forth.

In testimony whereof I have hereunto set my hand.

RICHARD S. WARING.

Witnesses:
R. H. WHITTLESEY,
C. L. PARKER.